United States Patent [19]
Wright et al.

[11] Patent Number: 5,695,257
[45] Date of Patent: Dec. 9, 1997

[54] SPOKED WHEEL TRIM ATTACHMENT SYSTEM

[75] Inventors: James P. Wright; Timothy L. Bates; Kevin D. Nash; Barry Lynn Roberts, all of Cookeville; John Davenport, Crossville, all of Tenn.

[73] Assignee: Phoenix USA, Inc., Cookeville, Tenn.

[21] Appl. No.: 741,129

[22] Filed: Oct. 31, 1996

Related U.S. Application Data

[63] Continuation of Ser. No. 604,409, Feb. 21, 1996, abandoned.
[51] Int. Cl.$^6$ ........................................... B60B 7/06
[52] U.S. Cl. ........................... 301/37.37; 301/37.32
[58] Field of Search ........................... 301/37.1, 37.31, 301/37.32, 37.33, 37.34, 37.37, 37.42, 108.1, 108.4

[56] References Cited

U.S. PATENT DOCUMENTS

| | | | |
|---|---|---|---|
| 3,724,905 | 4/1973 | Kachler | 301/37.37 |
| 4,458,952 | 7/1984 | Foster et al. | 301/37.37 |
| 4,596,425 | 6/1986 | Hung | 301/37.42 |
| 4,626,037 | 12/1986 | Kushner | 301/108.1 |
| 5,108,157 | 4/1992 | Chen | 301/37.42 |
| 5,188,428 | 2/1993 | Carter, III | 301/37.1 |
| 5,263,770 | 11/1993 | Goudey | 301/37.37 |

*Primary Examiner*—Russell D. Stormer
*Attorney, Agent, or Firm*—Waddey & Patterson; Edward D. Lanquist, Jr.

[57] ABSTRACT

The present invention discloses a wheel trim attachment system that uses a continuous attachment ring having mounting brackets which are pivotally and/or slidably attached to it thereby allowing it to be adjustable for different configurations of wheels. Additionally, the pivoting allows use for either a large diameter such as a spoked wheel or a small diameter such as a standard wheel. The attachment bracket receives an existing lug. Jam nuts are then placed over the bracket to hold the attachment bracket onto the existing lugs. Attachment screws are placed through holes in the liner and are received by mounting lips attached to the attachment ring to coordinate and correspond to the holes in the liner.

8 Claims, 3 Drawing Sheets

SPOKED WHEEL TRIM ATTACHMENT SYSTEM

This application is a continuation application of U.S. patent application Ser. No. 08/604,409 filed Feb. 21, 1996, entitled "Spoked Wheel Trim Attachment System now abandoned".

BACKGROUND OF THE INVENTION

The present invention relates generally to wheel trim attachment systems and more particularly to a wheel trim attachment system which can be used with either east spoke wheels or disc wheels.

It will be appreciated by those skilled in the art that individuals desire to place decorative wheel trim onto wheels to make them look better. These usually take the form of a decorative wheel trim liner or cell which is attached to the existing wheel to cover up the wheel. Unfortunately, wheel liners tend to take up lots of space. Therefore, inventory can take up a lot of room as well as a lot of profit. Therefore, universality is desired.

One of the most common types of wheels is the east spoke wheel. Cast spoke wheels typically have 3, 5, or 6 spokes which have rim clamp lugs on their outer portion that attach the rim assembly. For sizes which utilize the same size wheel cover these rim damp lugs fall on the same bolt circle.

What is needed, then is a wheel trim attachment system which can be easily placed onto a wheel. This needed system must be capable of use with either a disc wheel or a cast spoke wheel. This system must be adaptable for use in different bolt circles. This system is presently lacking in the prior art.

SUMMARY OF THE INVENTION

The present invention discloses a wheel trim attachment system that uses a continuous attachment ring having mounting brackets which are pivotally and/or slidably attached to it thereby allowing it to be adjustable for different configurations of wheels. Additionally, the pivoting allows use for either a large diameter bolt circle which are found on a east spoke wheel or a smaller diameter bolt circle which is found on a disc wheel. The attachment bracket receives an existing lug. Jam nuts are then placed over the bracket to hold the attachment bracket onto the existing lugs. Attachment screws are placed through holes in the liner and are received by mounting lips attached to the attachment ring to coordinate and correspond to the holes in the liner.

Accordingly, one object of the present invention is to provide a wheel trim attachment system.

Another object of the present invention is to provide a system which can be used with a large diameter bolt circle such as found on cast spoke wheel and a smaller diameter bolt circle such as found on disc wheels.

Still a further object of the present invention is to provide a wheel trim attachment system which can be used with disc wheels as well as east spoke wheels.

BRIEF DESCRIPION OF THE DRAWINGS

DESCRIPTION OF THE PREFERRED EMBODIMENT

Figure 1:
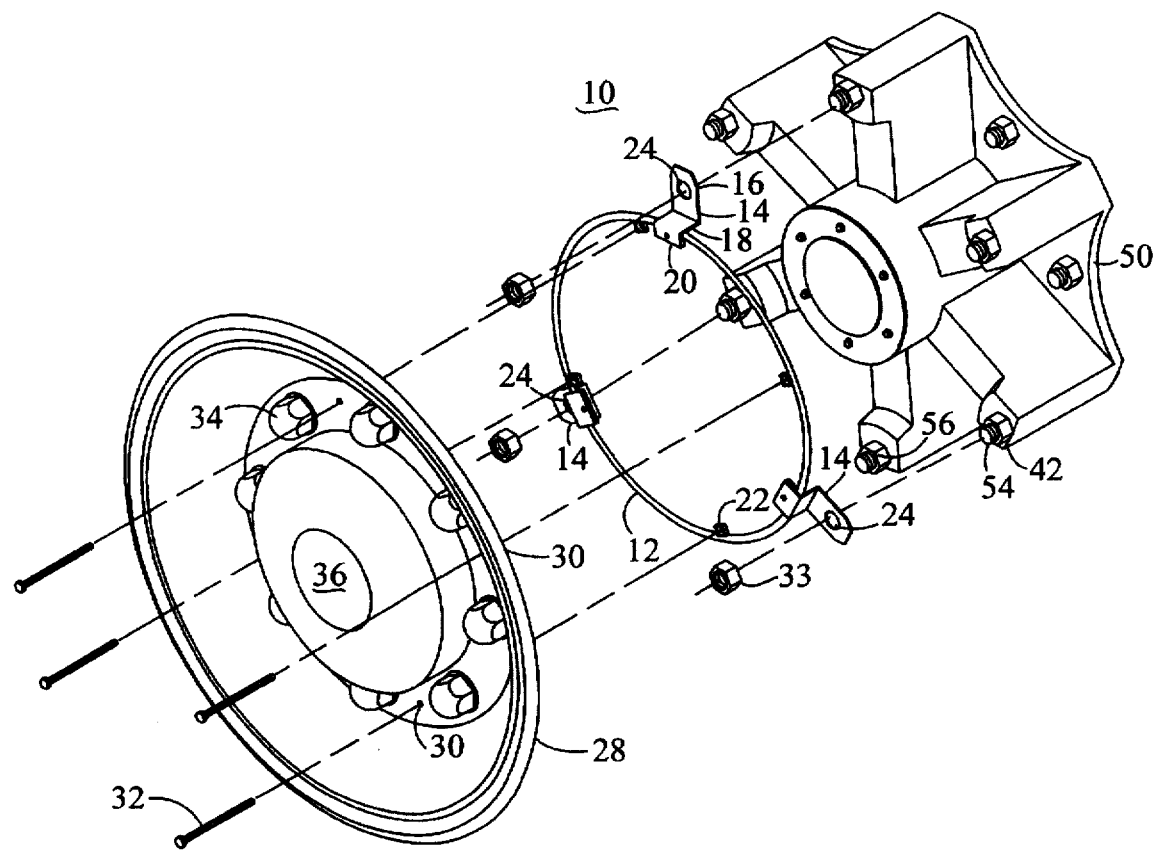
FIG. 1 is an exploded view of the wheel trim attachment system used on a cast spoke wheel.

Referring now to FIG. 1, there is shown generally at 10 the cast spoke wheel trim attachment system of the present invention. System 10 has continuous attachment ring which is make of any type of rigid metal. In the preferred embodiment, attachment ring is substantially 14.37 inches in diameter for 20" and 22.5" diameter cast spoke wheel and for disc wheels with 11.25" bolt circles. However, these rings can also be 11.25" in diameter or 17.5" in diameter. Attachment brackets 14 are attached to attachment ring 12. In the preferred embodiment, attachment brackets 14 are both pivotally and slidably connected to attachment ring 12. Therefore, holes 24 and attachment bracket 12 can be placed to correspond with either the large diameter bolt circle 42 of the cast spoke wheel 50 or the smaller diameter bolt circle (40 in FIG. 2) of the disc wheel (50' in FIG. 2). Attachment brackets 14 can be slid along attachment ring 12 to correspond with configurations of wheels. Some wheels 50 have six lugs as shown in FIG. 1. However, others have ten lugs 54 while some have more or less. Preferably, three attachment brackets 14 are used. However, any number can be used. Attachment brackets 14 have flange 16 which have hole and web 18 which joins flange 16 to pivot point 20. Liner 28 is provided with orifices 30. Attachment screws 32 are placed through orifices 30 and are received by mounting lips 22 which correspond to orifices 30. In the preferred embodiment, liner 28 can also have lug nut covers 34 and hub cover 36. Additionally, jam nuts 38 are used to attach attachment brackets 14 to lugs 54 over lug nuts Referring now to FIG. 2, there is shown generally at 10 the wheel trim attachment system of the present invention when used in connection with a disc wheel 50'.

Figure 2:
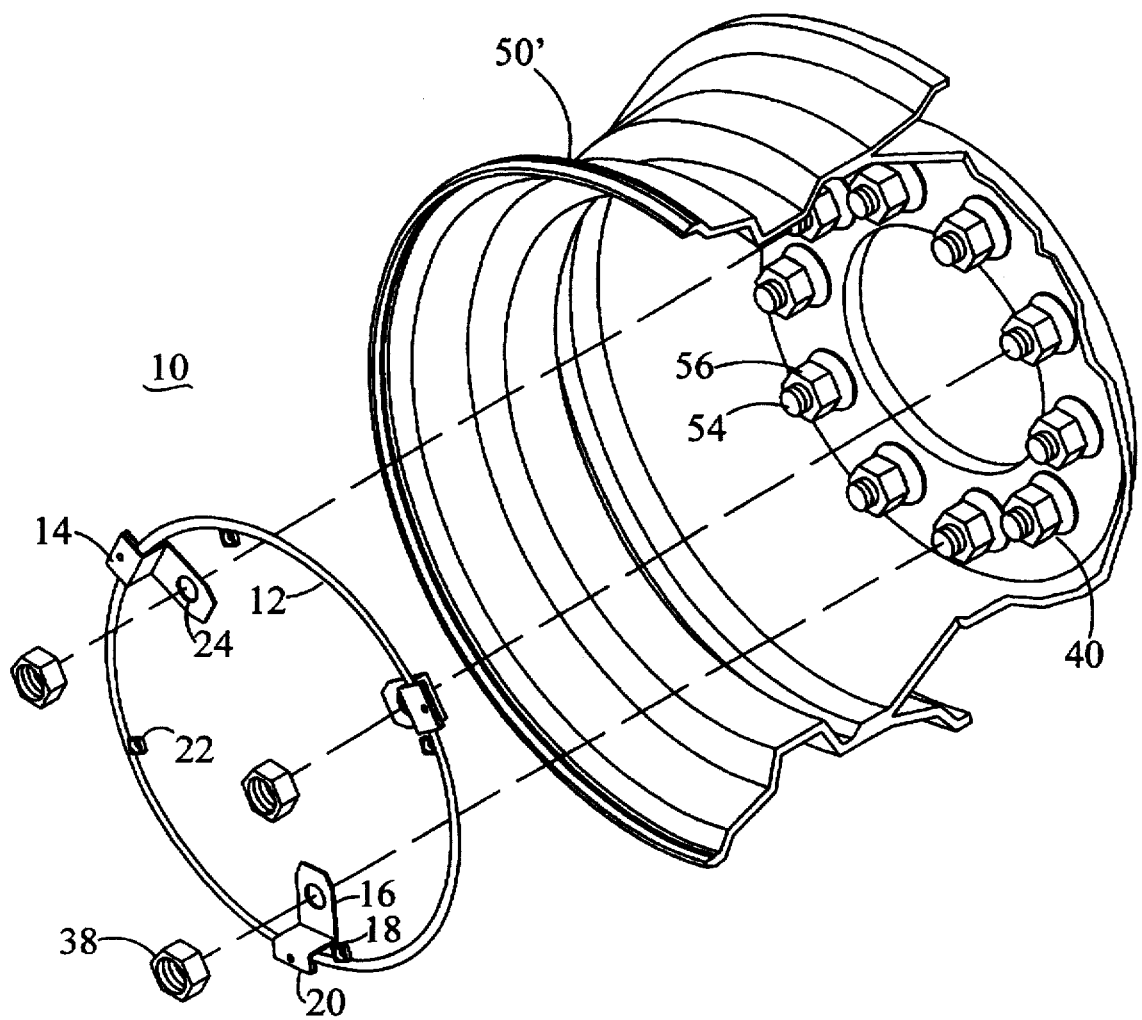
FIG. 2 is an exploded isometric view showing the wheel trim attachment system used in connection with a disc wheel.
Figure 3A:
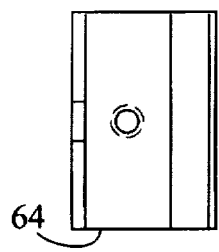
FIG. 3 is a side view of the attachment bracket of the present invention.
Figure 3B:
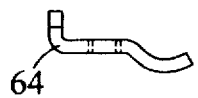
Figure 3C:
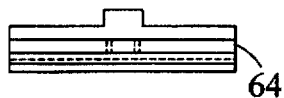
Figure 3D:
Figure 3E:
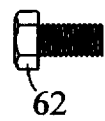
Figure 3F:
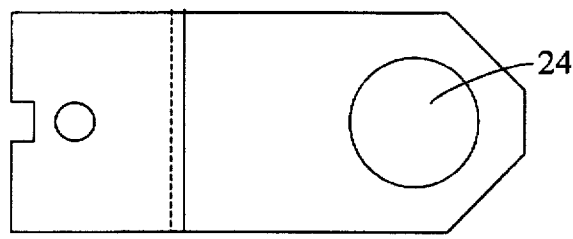
Figure 3G:
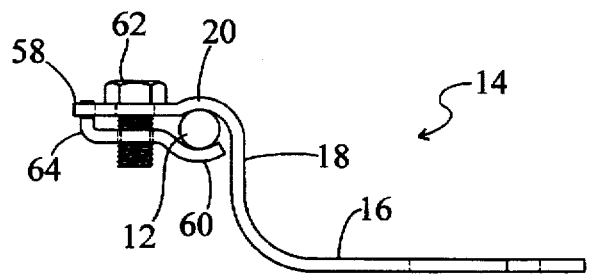

Referring now to FIGS. 1 and 2, one can see that the disc wheel (50' in FIG. 2) has a lug configuration of a smaller diameter 40 than that of the cast spoke wheel (50 in FIG. 1) which establishes a lug configuration of a larger diameter 42. However, the attachment ring can be used for both.

Referring now to FIG. 3, them is shown generally at 14 the attachment bracket of the present invention. Attachment bracket 14 has flange 16 having hole 24. Web 18 joins flange 16 to pivot point 20. Pivot point 20 consists of mated upper section 58 and lower section joined by set screw 62. Bottom section 64 has ridge 60 which receives bracket 12.

Thus, although there have been described particular embodiments of the present invention of a new and useful spoked wheel aim attachment system, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What we claim is:

1. A system for attaching a wheel liner to a wheel comprising:

a. an attachment ring;

b. plural attachment brackets pivotally attached to said attachment ring, each of said brackets having means for attaching said bracket to said wheel;

c. means for attaching said wheel liner to said attachment ring;

d. a pivot point attached to said attachment ring;

e. a flange having a hole for receiving a lug of said wheel; and f. a web joining said pivot point and said flange.

2. A system for attaching a wheel liner to a wheel comprising:

a. an attachment ring;

b. plural attachment brackets pivotally attached to said attachment ring, each of said brackets having means for attaching said bracket to said wheel;

c. means for attaching said wheel liner to said attachment ring d. plural mounting lips having threaded openings; and e. plural screws received by said threaded openings.

3. A system for attaching a wheel liner to either a cast spoke wheel or a disc wheel comprising:

a. a continuous attachment ring;

b. plural attachment brackets pivotally attached to said attachment ring, each of said brackets having a hole for receiving one of said lugs; and c. means for attaching said wheel liner to said attachment ring.

4. The system of claim 3 wherein said plural attachment brackets are slidably attached to said attachment ring.

5. The system of claim 3 wherein said plural attachment brackets further having:

a. a pivot point attached to said attachment ring;

b. a flange having a hole for receiving a lug of said wheel; and c. a web joining said pivot point and said flange.

6. The system of claim 3 wherein said means for attaching said wheel liner to said attachment ring comprises:

a. plural mounting lips having threaded openings; and b. plural screws received by said threaded openings.

7. A system for attaching a wheel liner to either a cast spoke wheel or a disc wheel comprising:

a. a continuous attachment ring having a diameter of substantially 14.37 inches;

b. plural attachment brackets pivotally and slidably attached to said attachment ring, each of said brackets having a hole for receiving one of said lugs, said plural attachment brackets forming a small diameter of substantially 11.25 inches and forming a large diameter of substantially 17.5 inches;

c. plural mounting lips attached to said attachment ring having threaded openings; and d. plural screws received by said threaded openings.

8. The system of claim 7 wherein said plural attachment brackets further having:

a. a pivot point attached to said attachment ring;

b. a flange having a hole for receiving a lug of said wheel; and c. a web joining said pivot point and said flange.

\* \* \* \* \*